United States Patent

Kuroda et al.

[11] Patent Number: 5,697,696
[45] Date of Patent: Dec. 16, 1997

[54] ORIGINAL ILLUMINATING APPARATUS

[75] Inventors: Koki Kuroda, Tokyo; Yoshio Mizuno, Ichikawa; Satoru Kanno; Mitsuru Amimoto, both of Yokohama; Ikuo Takeuchi, Tokyo, all of Japan

[73] Assignee: Canon Kabushiki Kaisha, Tokyo, Japan

[21] Appl. No.: 668,009

[22] Filed: Jun. 19, 1996

Related U.S. Application Data

[63] Continuation of Ser. No. 131,612, Oct. 5, 1993, abandoned.

[30] Foreign Application Priority Data

Oct. 6, 1992 [JP] Japan .................. 4-267459
Oct. 6, 1992 [JP] Japan .................. 4-267461

[51] Int. Cl.⁶ .................................................. F21S 3/00
[52] U.S. Cl. .................. 362/218; 362/220; 362/260; 362/294; 362/373; 313/44
[58] Field of Search .................. 362/218, 220, 362/260, 294, 373; 313/44, 45, 46; 439/226, 228, 232, 233, 235, 612

[56] References Cited

U.S. PATENT DOCUMENTS

| | | | |
|---|---|---|---|
| 2,515,747 | 7/1950 | Vaughan | 439/232 |
| 2,605,387 | 7/1952 | Brodie | 362/220 |
| 2,800,573 | 7/1957 | Hudson | 362/220 |
| 2,924,731 | 2/1960 | Martt et al. | 313/44 |
| 2,966,602 | 12/1960 | Waymouth et al. | 313/44 |
| 2,990,494 | 6/1961 | Liberman et al. | 313/46 |
| 3,309,565 | 3/1967 | Clark et al. | 362/218 |
| 3,917,971 | 11/1975 | Muzeroll | 313/44 |
| 3,965,345 | 6/1976 | Fordsmand | 362/218 |
| 4,071,799 | 1/1978 | Hammond et al. | 313/46 |
| 4,905,042 | 2/1990 | Tanaka et al. | 355/56 |
| 4,906,891 | 3/1990 | Takagi et al. | 439/226 |
| 4,949,007 | 8/1990 | Takagi et al. | 439/226 |
| 4,965,484 | 10/1990 | Fein | 313/46 |
| 5,161,884 | 11/1992 | Siminovitch | 362/218 |
| 5,174,646 | 12/1992 | Siminovitch et al. | 362/218 |
| 5,245,246 | 9/1993 | Boland et al. | 313/44 |

Primary Examiner—Alan Cariaso
Attorney, Agent, or Firm—Fitzpatrick, Cella, Harper & Scinto

[57] ABSTRACT

An original illuminating apparatus for use in a copying apparatus, an image reader, or a facsimile is provided with a fluorescent lamp having a long tube wall to illuminate an original; a heat radiating member provided at a position opposite to the original illuminating side of the fluorescent lamp; and a thermal coupling member which is close to the tube wall of the fluorescent lamp and the heat radiating member and is thermally coupled thereto. The thermal coupling member is provided within an effective light emission length in the longitudinal direction of the fluorescent lamp at a position different from the original illuminating side of the fluorescent lamp or on the side that is almost opposite to the original illuminating side of the fluorescent lamp.

21 Claims, 6 Drawing Sheets

ORIGINAL ILLUMINATING APPARATUS

This application is a continuation of application Ser. No. 08/131,612, filed Oct. 5, 1993, now abandoned.

BACKGROUND OF THE INVENTION

1. Field of the Invention

The present invention relates to an original illuminating apparatus which is used in a copying apparatus, an image reader, a facsimile, or the like and, more particularly, to an apparatus using a fluorescent lamp as an illuminating light source.

2. Related Background Art

A fluorescent lamp is often used as a light source to illuminate an original in an original illuminating apparatus.

A fluorescent lamp is constructed in a manner such that filament portions which emit thermoelectrons are located at both ends of a longitudinal glass tube, and the filament portion in the glass tube and the inside portion of the filament portion are called Faraday dark spaces, which do not contribute to the light emission. Such inside portion is a portion (called an effective light emission length) which actually contributes to the exposure. Further, in the fluorescent lamp, base portions to supply electric power to filaments are provided in the edge portions of the glass tube.

Therefore, a length of fluorescent lamp is equal to a length of the glass tube (effective light emission length plus Faraday dark space) plus base portion. A surplus length longer than the necessary length to expose the original has to be assured in the apparatus as a whole length of the fluorescent lamp. A diameter of glass tube is also generally set to 16 mm.

In recent years, to a demand for further miniaturization of the apparatus, a fluorescent lamp of a small diameter such as 10 mm, 8 mm, or the like has been put into practical use, so that an illuminating apparatus which can be arranged near the exposing surface of the original can be realized. With respect to the decrease in area of the non-light emitting portion in the longitudinal direction of the fluorescent lamp, a lamp such that a length of what is called a stem portion to support the filament, is reduced in association with the miniaturization. The long effective light emission length is used.

Further, in fluorescent lamps of a small diameter, when a base portion such as a base portion used in conventional fluorescent lamps of a diameter of 16 mm is provided, a diameter of the base portion must be almost equal to the diameter, for example, 8 mm of the glass tube, and hence it is difficult to use a conventional assembling tool or the like. A structure such that only the base portion is set to a size which is nearly equal to the large size of the conventional base portion, is contrary to the purpose for miniaturizing the apparatus by using the tube of a diameter of 8 mm, thus it is not a practical use. In case of fluorescent lamps of such a class, therefore, a lead wire of the filament portion is directly led out of the glass tube as it is, and its edge portion is bonded and connected to a conductor of an external electric wire with pressure by caulking or the like.

FIGS. 7 and 8 show an example of an illuminating apparatus as a background art of the invention using such a fluorescent lamp of a small diameter.

As shown in FIG. 7, a box-shaped frame body 108 is provided below an original supporting glass 103 onto which an original 110 is put. The frame body 108 has therein a long fluorescent lamp 101 of a small diameter and a reflecting member 102 arranged in parallel with the longitudinal direction of the fluorescent lamp 101. An upper cover 107 to cover the portions of the fluorescent lamp 101 and reflecting member 102 is provided above the frame body 108 in the whole longitudinal direction. Further, a photosensitive material 105 is provided below the frame body 108. A long image forming lens array 104 is arranged between the frame body 108 and the photosensitive material 105 in parallel with the reflecting member 102.

FIG. 8 is a diagram of the fluorescent lamp in FIG. 7 when it is seen from a direction perpendicular to the longitudinal direction.

In FIG. 8, leading portions 112 and external electric wires 113 for allowing a current to flow to filaments 111 are bonded and connected with a pressure to both end portions (reference numerals in the diagram mainly indicate component elements on one side) of the fluorescent lamp 101 by caulking portions 114.

Electrically, the fluorescent lamp is connected to a lighting apparatus (not shown) in this state, currents are supplied to the filaments 111, the filaments are preheated, and thermoelectrons are emitted. After that, by applying a predetermined voltage to the filament electrode portions on both sides, a discharge is started and the fluorescent lamp emits light.

In the above construction, the light flux emitted from the fluorescent lamp 101 is reflected by the reflecting member 102 and is mixed with the light which is directly led to the original supporting glass 103. The mixed light is directed to an illuminating position P through an exposing portion (A in the diagram) and is reflected at the illuminating position P. The reflected light flux is led onto the photosensitive material 105 through the image forming lens 104.

However, the above apparatus has the following drawbacks.

As mentioned above, where the effective light emission length for the whole length is set to be long by making the length of filament supporting member short in the fluorescent lamp of a small diameter, the heat in the end portions in the fluorescent lamp in the lighting state also propagates to the whole light emitting range of the fluorescent lamp, namely, to the effective light emission length.

FIGS. 9A to 9C show such a state. In FIGS. 9A to 9C, explanation will now be made with respect to the portion of an area C on one side in consideration of a fact that both sides of the fluorescent lamp are almost symmetrical.

FIG. 9A is a plan view of a portion near the fluorescent lamp of the illuminating apparatus shown in FIG. 7 mentioned above. FIG. 9B is a side elevational view of FIG. 9A.

FIG. 9C shows the surface temperature of the portion of the area C in FIG. 9A when the fluorescent lamp 101 is on. The temperature elevated by the heat generation of the filament 111 indicates a peak value, and the surface temperature decreases as a position approaches the light emitting portion (central portion). When the fluorescent lamp 101 is on, a whole portion near the fluorescent lamp 101 including the reflecting member 102 shows an almost similar tendency of the temperature distribution by the heat generation of the fluorescent lamp 101. In the fluorescent lamp 101 in the illuminating apparatus and near it, there are a portion (area B) which is covered by the upper cover 107 and the reflecting member 102 in the longitudinal direction of the fluorescent lamp 101, and a portion (area A) which is opened in an exposing direction of the original illuminating side.

In such a state, a temperature of the surface of the fluorescent lamp 101 in the portion of the area C changes as shown in FIG. 10 when the fluorescent lamp is turned off from the lighting state. Although the temperature drops by turning off the fluorescent lamp, the temperature decrease immediately after turning off of the fluorescent lamp in area A differs from that in area B.

Namely, since the tube surface of the fluorescent lamp on the area A side is directed to the opening portion, the temperature immediately after the light-off of the fluorescent lamp rapidly drops. However, since the tube surface on the area B side is covered by the reflecting member 102 and the upper cover 107, the temperature drops slowly as compared with that on the area A side.

There is, consequently, a tendency of mercury which has already been vaporized in the light-on state to be easily deposited as liquid particles onto the inside surface of the tube wall on the area A side having a large temperature change.

When flickering operations of the fluorescent lamp are repeated in such a state, an amount of mercury deposited to the inner walls of the fluorescent lamp is increased on the area A side, that is, both end portions in the exposing regions near the filaments on the illuminating side of the original supporting base on which the light necessary to expose the original is directed to the original supporting base. Thus, there is a drawback such that uniformity of light distribution in the longitudinal direction on the drum surface is lost and the light emission on both sides falls.

In the above apparatus, there is also a drawback such that when the fluorescent lamp as shown in FIG. 8 is assembled into a predetermined optical apparatus or the like, or when the external electric wires 113 are wired, unnecessary stresses are applied to the leading portions 112, so that the leading portions 112 are disconnected. Although projecting portions 115 occur in both end portions of the fluorescent lamp 101 for manufacturing reasons concerning a glass tube, it is understood that stresses are applied to such projecting portions in the handling process such as conveyance, assembly of the apparatus, or the like. Thus, there is a drawback such that the fluorescent lamp fails when it is lit on due to cracks or the like in the glass.

SUMMARY OF THE INVENTION

It is an object of the invention to provide an original illuminating apparatus having a fluorescent lamp for lighting without light fluctuation.

Another object of the invention is to provide an original illuminating apparatus in which a thermal coupling member is provided between a fluorescent lamp and a heat radiating member.

Still another object of the invention is to provide an original illuminating apparatus which corrects a light amount fluctuation of a fluorescent lamp.

A further another object of the invention is to provide an original illuminating apparatus in which the movement of each end portion of a fluorescent lamp can be adjusted.

A further another object of the invention is to provide an original illuminating apparatus which can prevent disconnection of lead wires of a fluorescent lamp.

A further another object of the invention is to provide an original illuminating apparatus in which a projecting member is provided in each end portion of a fluorescent lamp.

The above and other objects and features of the present invention will become apparent from the following detailed description and the appended claims with reference to the accompanying drawings.

DETAILED DESCRIPTION OF THE PREFERRED EMBODIMENTS

Embodiments of the present invention will now be described hereinbelow with reference to the drawings.

Figure 1:
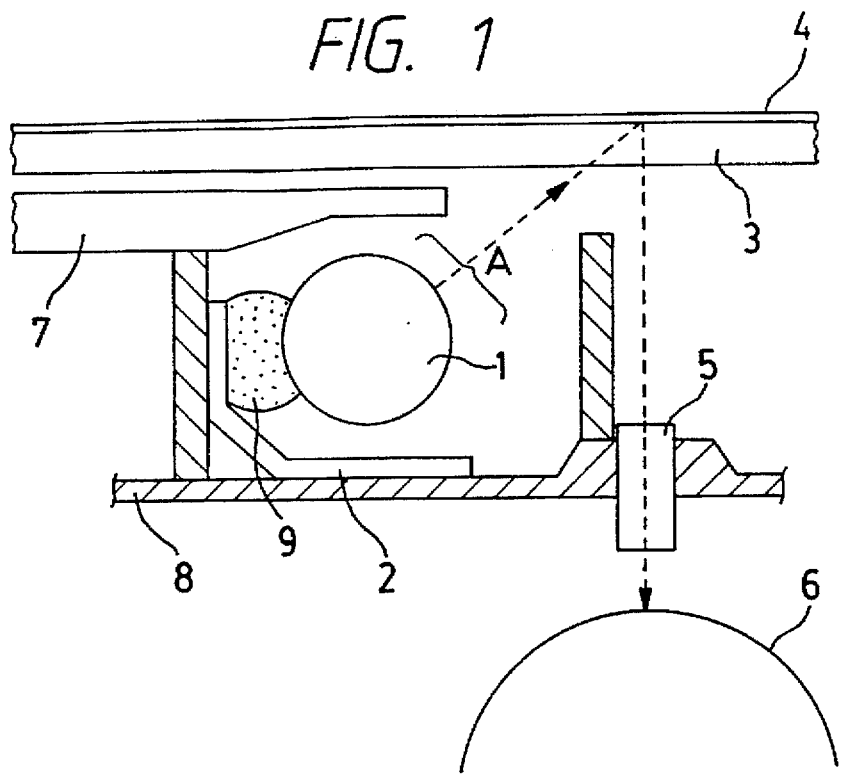
FIG. 1 is a cross-sectional view of an original illuminating apparatus according to an embodiment of the invention.

FIG. 1 is a cross-sectional view of an original illuminating apparatus according to an embodiment of the invention. In FIG. 1, reference numeral 1 denotes a fluorescent lamp and 2 indicates a reflecting member formed by a metal such as aluminum or the like having a high heat conductivity. The reflecting member 2 has a heat radiating function and is arranged at a position different from the original illuminating side, namely, at a position on the side that is almost opposite to the original illuminating side. Reference numeral 3 denotes an original supporting glass onto which an original 4 is put; 5 a lens array of a short focal point; 6 a photosensitive drum; 7 an upper cover; 8 a frame body in which the illuminating apparatus is enclosed; and 9 a thermal coupling material. The fluorescent lamp has a long glass tube coated with a fluorescent material and filaments attached in both end portions of the glass tube. A diameter of glass tube is equal to about 8 mm.

The thermal coupling material 9 is made of, for example, silicon rubber as a silicon resin having a high heat conductivity. The thermal coupling material 9 is filled in a portion between the tube wall of the long fluorescent lamp 1 and the reflecting member 2 as a heat radiating member and is in close proximity to the lamp 1 and the member 2, at the position different from the original illuminating side (A) of the fluorescent lamp, namely, at the position on the side that is almost opposite to the original supporting glass (original illuminating side) of the fluorescent lamp. The thermal coupling material functions to transfer the heat of the tube wall of the fluorescent lamp to the heat radiating member.

Figure 2:
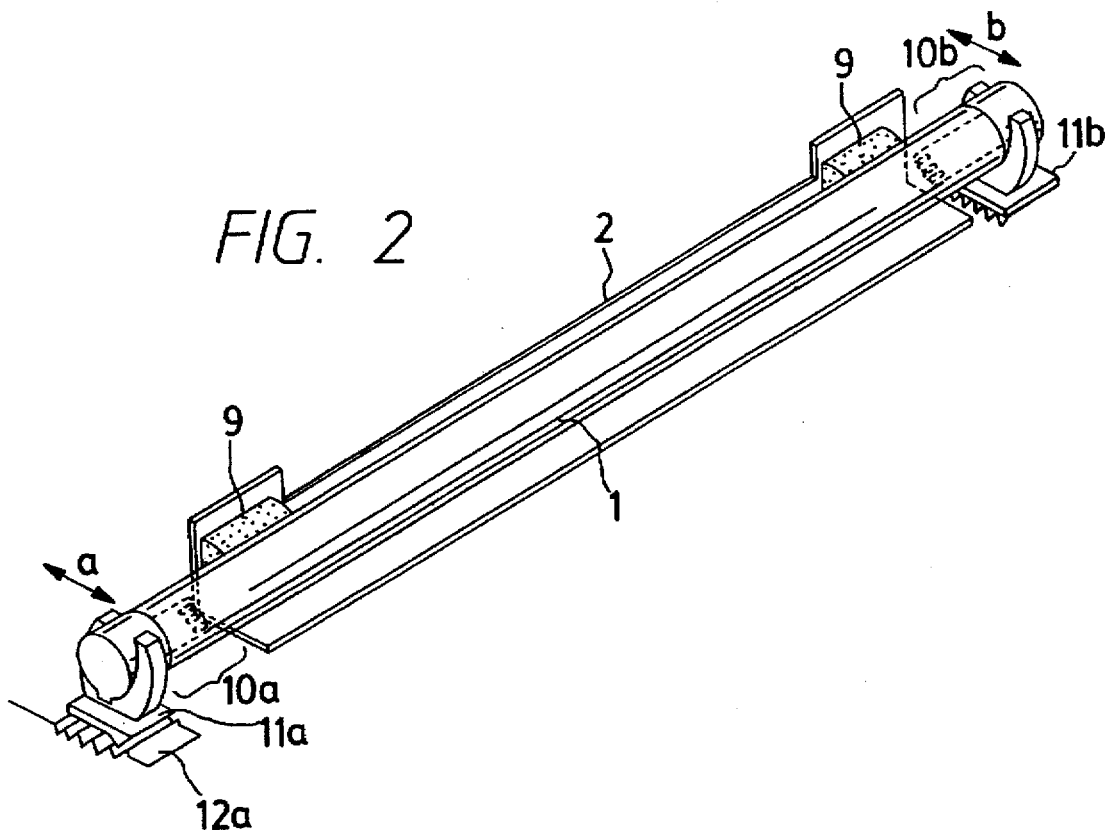
FIG. 2 is a perspective view of a fluorescent lamp in FIG. 1.

FIG. 2 is a perspective view around the fluorescent lamp as a main section in FIG. 1 as a center.

The positions of the thermal coupling material 9 in the longitudinal direction of the fluorescent lamp is located near left and right filament portions 10a and 10b of the long fluorescent lamp 1, respectively, and lie within the effective light emission length of the fluorescent lamp.

The effective light emission length indicates an inside area of dark portions (Faraday dark spaces) of both end portions of the fluorescent lamp and substantially corresponds to the maximum width of the area to be illuminated.

According to the embodiment as mentioned above, by providing the thermal coupling material 9, the temperature of the tube wall of the fluorescent lamp when it is turned off on the side on which the thermal coupling material is provided can be decreased faster than that in the exposure opening portion on the original supporting glass illuminating side. It is possible to prevent liquefied mercury from being deposited on the original supporting glass illuminating side of the fluorescent lamp.

The fluorescent lamp 1 is held at both end portions thereof by elastic supporting members 11a and 11b 11a and 11b. An elastic claw is formed in a part of the supporting member, and position adjusting means which is come into engagement with wave-shaped projections formed in a part 12a of the frame body is provided. That is, the supporting member 11a is in engagement with the frame body 12a so as to be slidable in the direction shown by an arrow a in FIG. 2. The rear side also has a similar construction such that the supporting member 11b is slidable in the direction shown by an arrow b in FIG. 2. The position of the supporting member is restricted step by step by the cooperation of the projection and the elastic claw.

With such a structure, the thermal coupling material 9 are arranged and the supporting members 11a and 11b are finely adjusted in the front/rear directions a, b. That is, the supporting members are moved so as to be away from or approach the reflecting member, thereby making it possible to adjust the uniformity in the longitudinal direction of the light amount on the photosensitive drum 6. In this instance, since the thermal coupling material 9 has elasticity, it can trace relative to the stepwise position adjustment and can be close to the fluorescent lamp and the reflecting member, thereby maintaining sufficient thermal coupling performance.

Particularly, the above construction is effective despite inherent manufacturing inaccuracies such as unevenness of thickness caused by manufacturing of fluorescent lamp.

Namely, in a step of coating the inner surface of the fluorescent lamp with a fluorescent material, the glass tube is placed in the vertical direction and a liquid fluorescent material is poured into the tube from the upper portion. The fluorescent material flows from the upper portion to the lower portion and is coated onto the whole inner wall surface of the glass tube. Therefore, considering a thickness of fluorescent material, there is a tendency such that a thickness of the portion where the fluorescent material starts to flow is thin and a thickness of the portion where the flowing of the fluorescent material ends is thick. In case of the conventional glass tube having a diameter of 16 mm or the like, an inner diameter is large and a distance from the light emitting source to the original reflecting surface is also long enough, thus such tendency of slight unevenness regarding the thickness of the fluorescent material on manufacturing as mentioned above can be ignored. However, in case of the fluorescent lamp of a small diameter of 8 mm in which the distance up to the original reflecting surface is short as in the present embodiment, such tendency of the uneven thickness of the fluorescent material has an adverse effect. It is, accordingly, effective to have the structure as mentioned above such that the whole fluorescent lamp can be finely adjusted relative to the reflecting member while being inclined from the parallel arrangement in such a direction as to correct the unevenness of the thickness of the fluorescent material.

In the above construction, therefore, by forming the thermal coupling materials by elastic members, the thermal coupling materials can sufficiently fill the portions between the fluorescent lamp and the reflecting members. It is possible to provide an apparatus capable of preventing mercury from being deposited onto the original supporting glass illuminating side while considering a fluctuation in thickness of the fluorescent material.

A structure of the end portions of the fluorescent lamp in the embodiment will now be described with reference to FIGS. 3 and 4.

Figure 3:
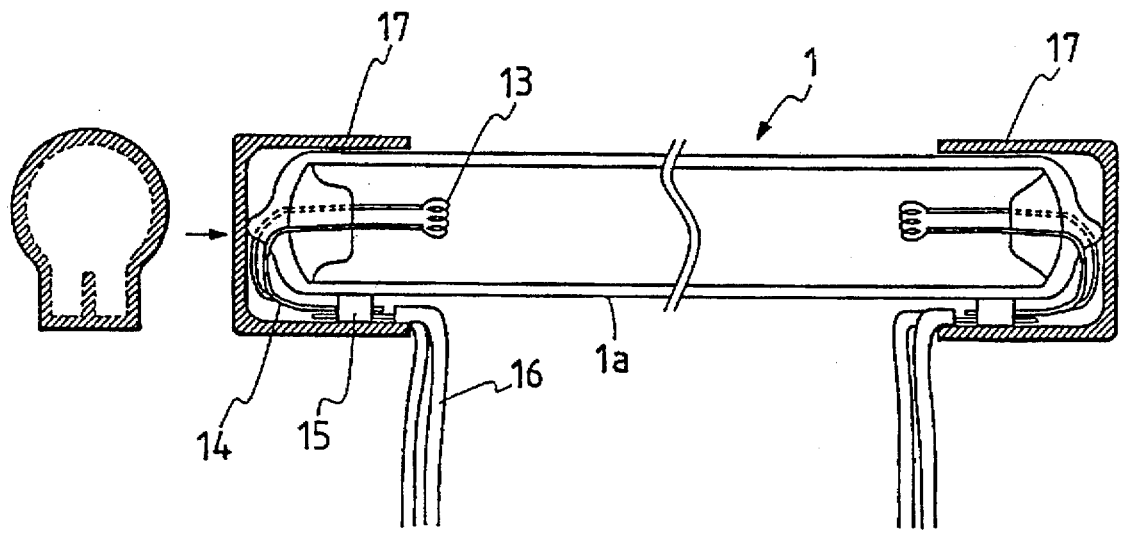
FIG. 3 is a cross-sectional view of the fluorescent lamp in FIG. 1 when it is seen from the direction perpendicular to the longitudinal direction.

FIG. 3 is an view of the fluorescent lamp of the embodiment when it is seen from the direction perpendicular to the longitudinal direction.

In the embodiment, leading portions 14 and external electric wires 16 are bonded and connected with pressure by caulking portions 15 as pressure bonding connecting portions. After that, two leading portions are bent in the direction of the central portion (longitudinal direction) of the glass tube while keeping a parallel state and are wired along the glass tube wall. In this state, cylindrical protecting members 17 made of rubber as an elastic material are pushed to the glass tube from the outside, so that the glass tube end portions, leading portions 14, caulking portions 15, and parts of the external electric wires 16 are covered and protected at both ends of the fluorescent lamp 1, respectively. Reference numeral 13 denotes filaments attached to the end portions of the glass tube.

An inner diameter of the protecting member 17 is substantially equal to the outer diameter of the fluorescent lamp. The protecting member 17 is designed to accommodate the leading portion, caulking portion, and external electric wire between the inner wall of the projecting member 17 and the outer wall of the fluorescent lamp 1.

The caulking portion 15 is pressed onto a glass tube wall 1a by the elasticity of the protecting member 17.

Figure 4:
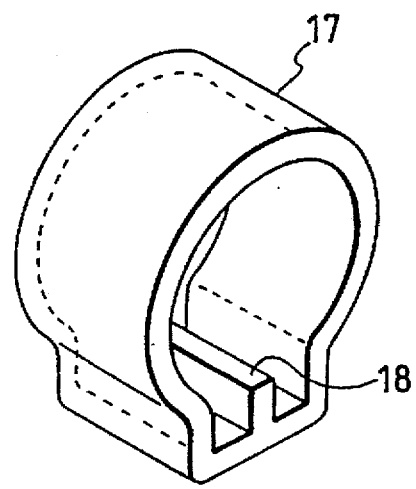
FIG. 4 is a perspective view of a projecting member in FIG. 3.

FIG. 4 is a perspective view of the protecting member 17. A wall portion 18 is formed in the protecting member 17 so as to prevent the two leading portions from contacting each other.

In the embodiment as mentioned above, since the caulking portion 15 is pressed and held onto the glass tube wall 1a by the elastic force of the protecting member 17, even when the external electric wires are wired in the apparatus, no stress is applied to the leading portion and the disconnection of the leading portion can be prevented.

Since the protecting member covers the whole end portion of the glass tube, even when the fluorescent lamp is assembled into the apparatus as well, the leading portions are not hooked in the apparatus. Cracking or the like never occurs when projecting portions formed upon manufacturing if the end portions of the glass tube collide with some other portions. Thus, the fluorescent lamp can be safely assembled into the apparatus.

Although the embodiment has a construction such that the caulking portion is pressed onto the tube wall of the fluorescent lamp by the protecting member, by changing the inside shape of the protecting member and by constructing such as to press both of the leading portion and the external electric wires onto the tube wall by the protecting member, it is further advantageous in case of wiring the external electric wires.

Figure 5:
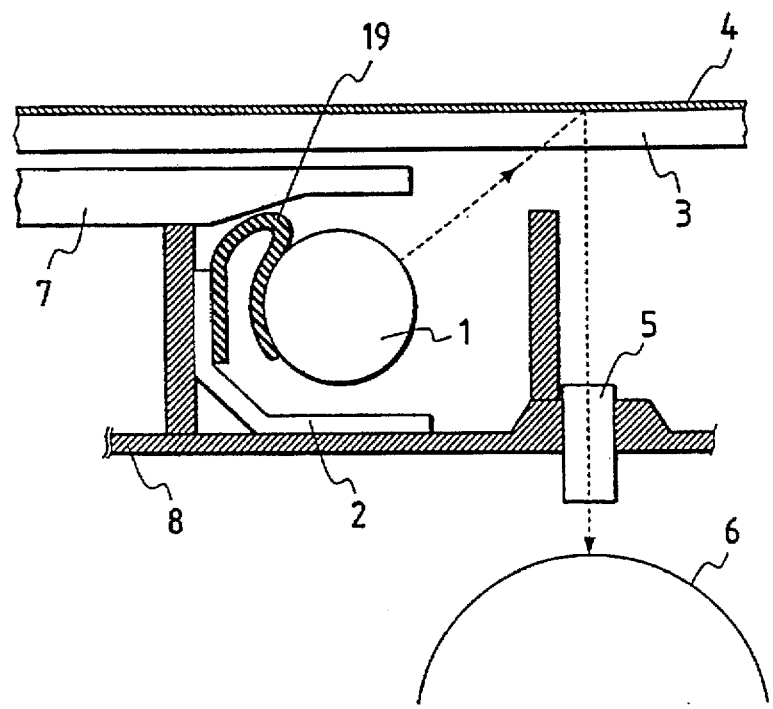
FIG. 5 is a cross-sectional view of an original illuminating apparatus according to another embodiment of the invention.

FIG. 5 shows another embodiment of the invention. Since its fundamental construction is substantially the same as that of the foregoing embodiment, only different portions will now be described.

In the embodiment, a silicon sheet 19 made of silicon resin having a heat conductivity serving as a thermal coupling member is arranged by being bent between the fluorescent lamp 1 and the reflecting member 2 as a heat radiating member.

The reflecting member 2 is made of an aluminum plate having a predetermined thickness and is adhered to the silicon sheet 19 by a pressure bonding or by using an adhesive agent of silicon system. The silicon sheet 19 is also adhered to the glass surface of the fluorescent lamp 1 by a predetermined method similar to that in case of the reflecting member 2.

By the above construction, the silicon sheet 19 has enough long length to assure its contact with the fluorescent lamp and the reflecting member even when the fluorescent lamp 1 moves.

There is also an effect such that mercury is not deposited onto the glass surface of the fluorescent lamp on the original illuminating side in a manner similar to that in the above embodiment.

Figure 6:
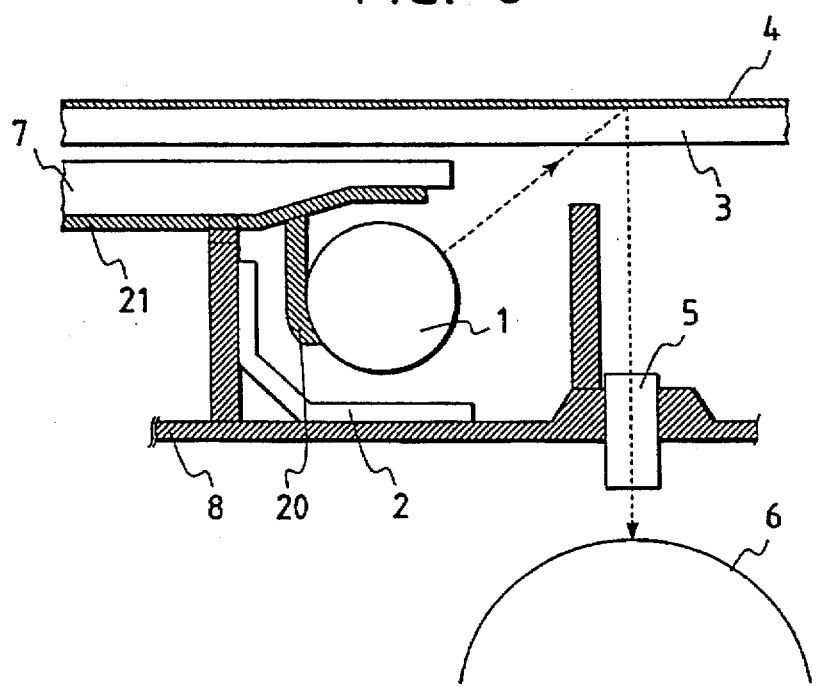
FIG. 6 is a cross-sectional view of an original illuminating apparatus according to still another embodiment of the invention.
Figure 7:
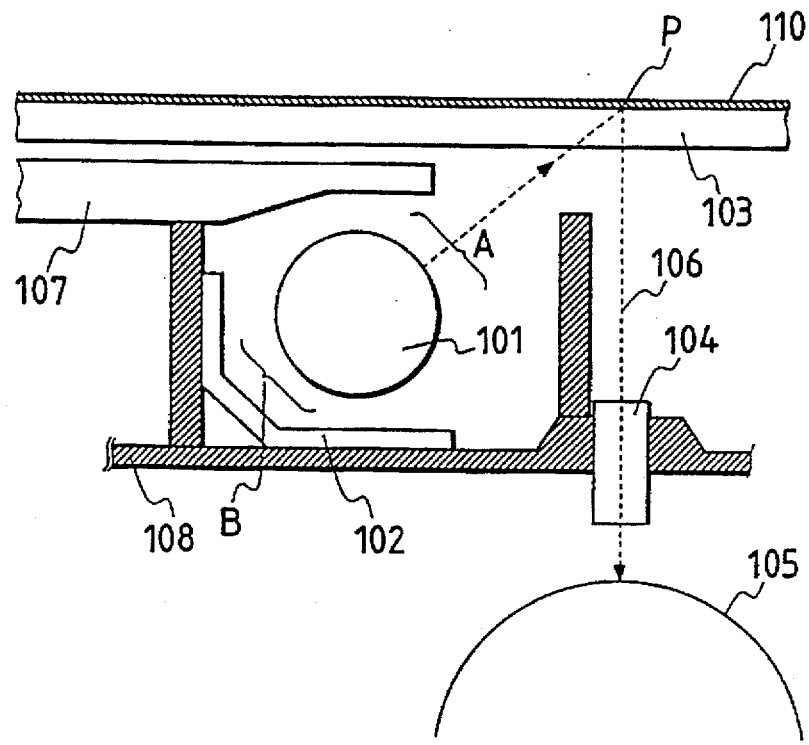
FIG. 7 is a cross-sectional view of an original illuminating apparatus as a background art of the invention.
Figure 8:
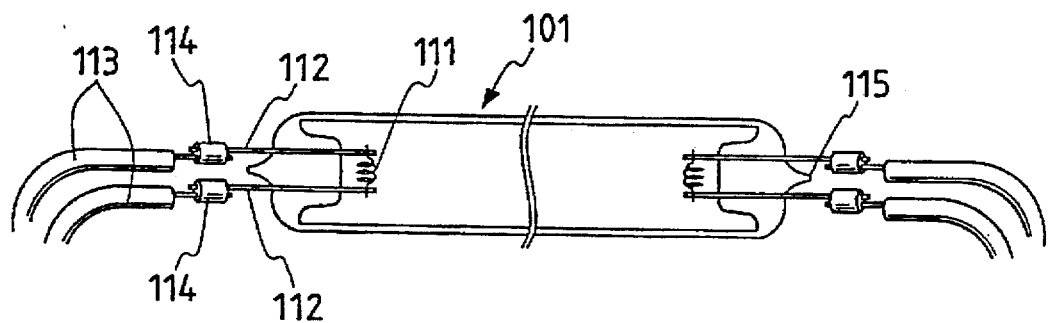
FIG. 8 is a cross-sectional view of a fluorescent lamp in FIG. 7 when it is seen from the direction perpendicular to the longitudinal direction.
Figure 9A:
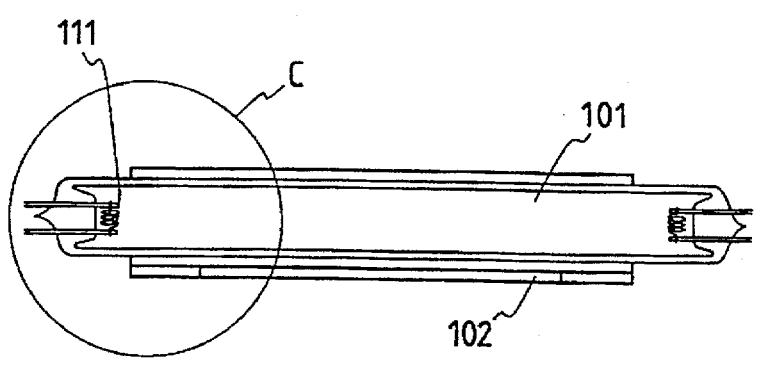
FIG. 9A is a plan view of the fluorescent lamp in FIG. 7.
Figure 9B:
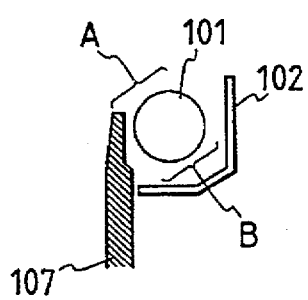
FIG. 9B is a side elevational view of FIG. 9A.
Figure 9C:
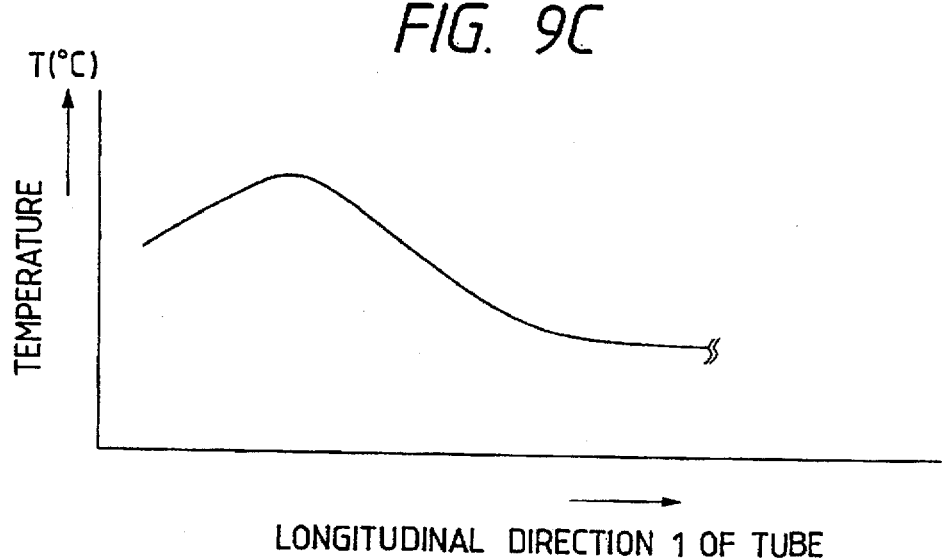
FIG. 9C is a graph showing a temperature distribution of the fluorescent lamp.
Figure 10:
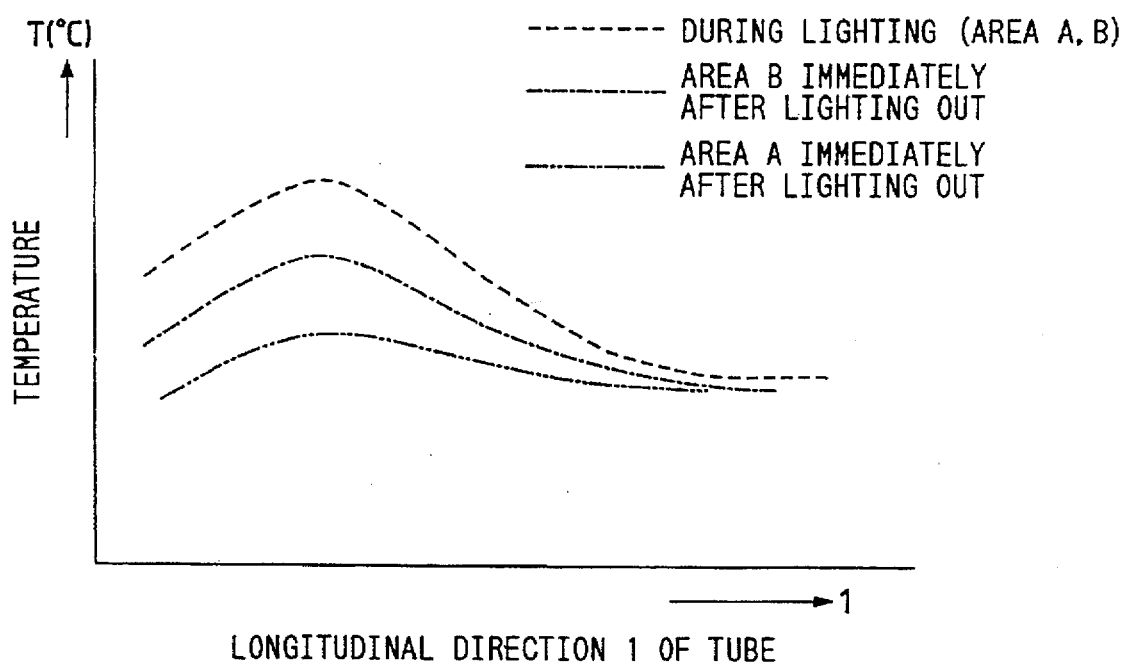
FIG. 10 is a graph showing temperature distributions when the fluorescent lamp is turned on and off.

FIG. 6 shows a further embodiment of the invention.

In the embodiment, another independent member different from the reflecting members 2 mentioned in the embodiments of FIGS. 1 and 5 is used as a heat radiating member.

In FIG. 6, a heat radiating member 21 is provided at the position so as not to have any effect on the exposure of the fluorescent lamp, for example, in almost the whole region on the inside of the upper cover 7 in the longitudinal direction in parallel with the fluorescent lamp 1. For example, a silicon rubber sheet as a silicon resin having a heat conductivity or a heat radiating performance is used as a material of the heat radiating member 21. A thermal coupling member 20 is provided with the heat radiating member 21, as a part thereof or as another member. The thermal coupling member 20 is close to the tube wall on the different side opposite to the original illuminating side of the fluorescent lamp 1, thereby thermally coupling with the heat radiating member 21.

According to the embodiment, consequently, a size of heat radiating member can be freely set and a heat radiating effect can be enhanced.

An effect similar to that in the above embodiments can be also obtained.

Although the above embodiments have been described on the assumption that the diameter of fluorescent lamp is equal to 8 mm, the invention is effective for any other fluorescent lamp of a small diameter so long as the diameter is equal to or less than about 10 mm.

Although the invention has been described above, the invention is not limited to the foregoing embodiments but many modifications and variations are possible within the spirit and scope of the appended claims of the invention.

What is claimed is:

1. An original illuminating apparatus to illuminate an original, said apparatus comprising:

a fluorescent lamp having a tube to illuminate the original;

a reflecting member for reflecting light emitted from said fluorescent lamp toward the original, said reflecting member being opposite to a part in a circumferential direction of said fluorescent lamp such that a part of light emitted radially from said fluorescent lamp is directly guided to the original without being reflected by said reflecting member; and a thermal coupling member which is in contact with the part in the tube circumferential direction of said fluorescent lamp and opposite to said reflecting member, and in contact with said reflecting member, and is thermally coupled to a part of the tube and a part of said reflecting member in a longitudinal direction of said fluorescent lamp.

2. An apparatus according to claim 1, wherein said thermal coupling member is provided at a position different from an original illuminating side of said fluorescent lamp.

3. An apparatus according to claim 2, wherein said thermal coupling member is provided on a side of said fluorescent lamp that is substantially opposite to the original illuminating side of said fluorescent lamp.

4. An apparatus according to claim 1, wherein said fluorescent lamp comprises a filament at an end portion of said fluorescent lamp and said thermal coupling member is provided near said filament.

5. An apparatus according to claim 1, wherein said thermal coupling member is bent between said tube of said fluorescent lamp and said reflecting member.

6. An apparatus according to claim 1, wherein said reflecting member is provided for an upper cover to cover said fluorescent lamp.

7. An apparatus according to claim 1, wherein an effective light emission length of said fluorescent lamp substantially corresponds to a maximum width of a region to be illuminated.

8. An original illuminating apparatus to illuminate an original, said apparatus comprising:

a fluorescent lamp having a tube wall to illuminate the original, in which a fluorescent material has been allowed to flow onto said tube wall and a thickness of said fluorescent material differs along a longitudinal direction of said fluorescent lamp;

a reflecting member for reflecting light emitted from said fluorescent lamp toward the original, said reflecting member being adjacent to said fluorescent lamp; and adjusting means for adjusting inclination of the tube of said fluorescent lamp.

9. An apparatus according to claim 8, wherein said adjusting means is provided in both end portions of said fluorescent lamp.

10. An apparatus according to claim 8, further comprising:

a heat radiating member provided at a position different from an original illuminating side of said fluorescent lamp; and a thermal coupling member which is close to said tube wall of the fluorescent lamp and said heat radiating member, and is thermally coupled to said tube wall and said heat radiating member.

11. An apparatus according to claim 10, wherein said thermal coupling member is an elastic member.

12. An illuminating apparatus to illuminate an original, said apparatus comprising:

a fluorescent lamp to illuminate the original, wherein said fluorescent lamp comprises a long tube wall, filaments provided in end portions of said tube wall in a longitudinal direction of said tube wall, and leading wires led out from said filaments to an outside of said tube wall, and said leading wires of said fluorescent lamp are connected to external electric wires by pressure bonding and are bent along said tube wall; and a plurality of protecting members to cover the end portions of said tube wall of said fluorescent lamp and said leading wires, wherein said protecting members press pressure bonded connecting portions of said leading wires of said fluorescent lamp against said tube wall.

13. An apparatus according to claim 12, wherein said plurality of protecting members are elastic members.

14. An apparatus according to claim 12, wherein said plurality of protecting members are bent in the end portions of said fluorescent lamp.

15. An apparatus according to claim 12, wherein said plurality of protecting members have a wall portion in order to avoid contact between said leading wires.

16. An apparatus according to claim 12, further comprising:
   a heat radiating member provided at a position different from an original illuminating side of said fluorescent lamp; and
   a thermal coupling member which is close to said tube wall of said fluorescent lamp and said heat radiating member, and is thermally coupled to said tube wall and said heat radiating member.

17. An apparatus according to claim 12, further comprising adjusting means for moving an end portion of said fluorescent lamp in a direction perpendicular to a longitudinal direction of said fluorescent lamp.

18. An original illuminating apparatus to illuminate an original, said apparatus comprising:
   a fluorescent lamp comprising a long tube wall to illuminate the original;
   a heat radiating member provided at a position different from an original illuminating side of said fluorescent lamp; and
   a silicon rubber member having elasticity which is close to said tube wall of said fluorescent lamp and said heat radiating member, and is thermally coupled to said tube wall and said heat radiating member in a longitudinal direction of said fluorescent lamp.

19. An apparatus according to claim 18, wherein said thermal coupling member having elasticity is provided in an effective light emission length in a longitudinal direction of said fluorescent lamp.

20. An apparatus according to claim 18, wherein said thermal coupling member having elasticity is provided at a position different from an original illuminating side of said fluorescent lamp.

21. An apparatus according to claim 20, wherein said thermal coupling member having elasticity is provided on a side of said fluorescent lamp that is almost opposite to the original illuminating side of said fluorescent lamp.

* * * * *

UNITED STATES PATENT AND TRADEMARK OFFICE
CERTIFICATE OF CORRECTION

PATENT NO. : 5,697,696
DATED : December 16, 1997
INVENTOR(S) : KURODA et al.

It is certified that error appears in the above-identified patent and that said Letters Patent is hereby corrected as shown below:

Column 1

Line 54, "not" should read --not of--.

Column 3

Line 39, "on" should be deleted.
    Line 54, "another" should be deleted.
    Line 57, "another" should be deleted.
    Line 60, "another" should be deleted.

Column 5

Line 18, "11a and 11b 11a and 11b." should read --11a and 11b--.

Column 6

Line 16, "an" should read --a--.

UNITED STATES PATENT AND TRADEMARK OFFICE
CERTIFICATE OF CORRECTION

PATENT NO. : 5,697,696
DATED : December 16, 1997
INVENTOR(S) : KURODA et al.

It is certified that error appears in the above-identified patent and that said Letters Patent is hereby corrected as shown below:

<u>Column 7</u>

Line 18, "long" should be deleted.
    Line 35, "sheet" should read --sheet such-- and "a" (second occurrence) should read --a good--.

Signed and Sealed this

Twenty-second Day of September, 1998

Attest:

BRUCE LEHMAN

*Attesting Officer*      *Commissioner of Patents and Trademarks*